United States Patent [19] [11] 4,252,294
Uchio [45] Feb. 24, 1981

[54] MOLD FOR INJECTION MOLDING
[75] Inventor: Shunji Uchio, Koganei, Japan
[73] Assignee: Asahi Kase Kogyo Kabushikia Kaisha, Tokyo, Japan
[21] Appl. No.: 101,108
[22] PCT Filed: Jun. 20, 1979
[86] PCT No.: PCT/JP78/00011
 § 371 Date: Jun. 25, 1979
 § 102(e) Date: Jun. 20, 1979
[87] PCT Pub. No.: WO 79/00235
 PCT Pub. Date: May 3, 1979

[30] Foreign Application Priority Data
Oct. 25, 1977 [JP] Japan .................. 52-127215

[51] Int. Cl.³ .................. B29F 1/022; B29C 1/00; B29D 11/00
[52] U.S. Cl. .................. 249/105; 425/572; 425/542; 425/808
[58] Field of Search .......... 425/572, 573, 577, 588, 425/808, DIG. 42, 542; 249/57, 105, 107, 109, 110, 63, 64, 67, 68

[56] References Cited
U.S. PATENT DOCUMENTS

| | | | |
|---|---|---|---|
| 2,165,762 | 7/1939 | Reid | 249/107 X |
| 2,339,443 | 1/1944 | Wilson | 425/577 |
| 2,360,011 | 10/1944 | Popp | 249/110 X |
| 2,799,435 | 7/1957 | Abplanalp | 249/107 X |
| 2,878,517 | 3/1959 | Cramer | 249/107 |
| 3,013,308 | 12/1961 | Armour | 425/573 X |
| 3,121,913 | 2/1964 | Hagmann et al. | 425/DIG. 42 |
| 3,247,550 | 4/1966 | Haines | 425/808 |
| 3,333,300 | 8/1967 | Cohan | 425/577 X |
| 3,341,897 | 9/1967 | Susuki et al. | 425/577 |
| 3,428,289 | 2/1969 | Heckrotte et al. | 249/105 |
| 3,463,849 | 8/1969 | Winkler | 425/577 X |
| 3,537,676 | 11/1970 | Miller | 425/577 X |
| 3,776,676 | 12/1973 | Kessler | 249/110 X |
| 3,957,411 | 5/1976 | Schiesser | 425/DIG. 42 |
| 4,091,057 | 5/1978 | Weber | 425/808 |
| 4,184,835 | 1/1980 | Talbot | 425/808 |

FOREIGN PATENT DOCUMENTS 32-10870 12/1957 Japan .
46-4070 1/1971 Japan .

OTHER PUBLICATIONS

Shiraishi Jimichiro, "Shashutsuseikeijou Kavagata", pp. 105 & 99, (1976-12-10), (applicant).
Japan Plastics, vol. 14, No. 2, (1963-2), p. 24, (applicant).

Primary Examiner—J. Howard Flint, Jr.

[57] ABSTRACT

A mold for injection molding suitable for the production of those molded synthetic resin articles such as lenses and prisms which are required to be homogeneous and isotropic, in which first and second gates (3, 4) are provided between runner (2) and cavity (1), said first gate (3) having a cross-sectional area smaller than that of runner (2) and connecting to second gate (4); said second gate (4) extending from first gate (3) with the width progressively increasing in a form simulating the shoulder part of a coathanger to meet cavity (1) and having constriction (5) provided halfway to the cavity.

6 Claims, 26 Drawing Figures

FIG. 4A
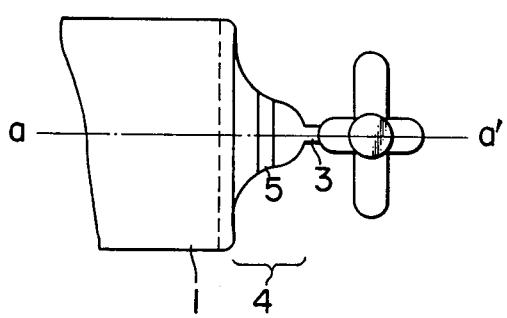
FIG. 5
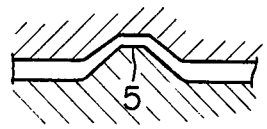
FIG. 4B
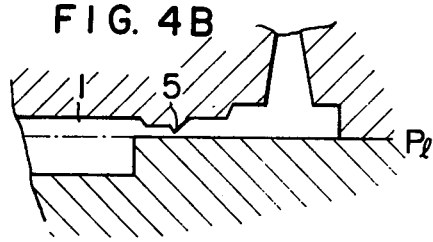
FIG. 6
FIG. 7
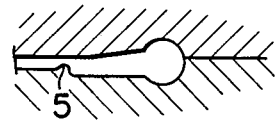
FIG. 8
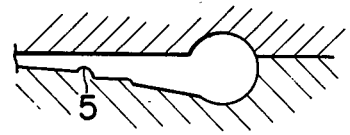
FIG. 9
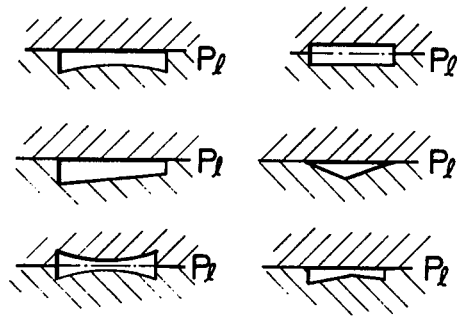

FIG. 17A
FIG. 17B
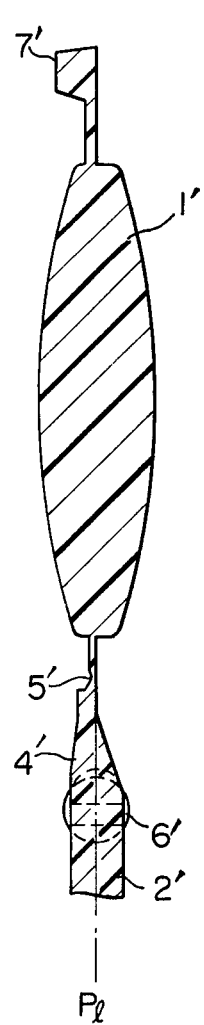
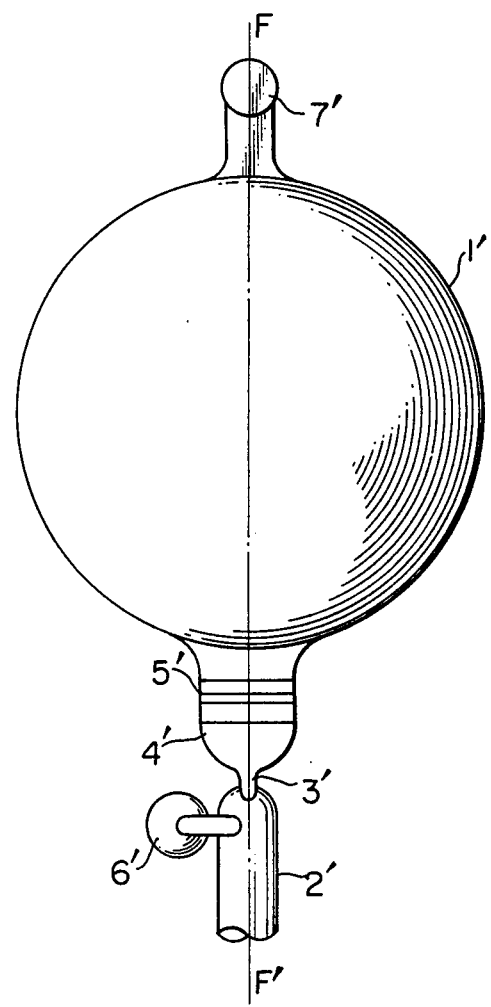

4,252,294

MOLD FOR INJECTION MOLDING

TECHNICAL FIELD

This invention relates to a mold for the injection molding of thermoplastic resins. More particularly, it relates to a mold for injection molding, which is suitable for the production of strainless, homogeneous, isotropic and clear injection molded articles such as, for example, lenses, prisms, dial plates and the like.

BACKGROUND ART

Casting, in which a liquid monomer is poured into a mold and transformed into a polymer, is a suitable method for the formation of transparent articles such as lenses, prisms and the like, because casting easily gives strainless isotropic molded articles. Extrusion molding can give fairly uniform and isotropic articles, though not so satisfactorily as with casting. In contrast to these, injection molding has heretofore been most unsuitable for obtaining homogeneous isotropic molded articles and, hence, in spite of being very efficient as a forming method, has not been used in molding those articles which are required to be homogeneous and isotropic. The reason is that in injection molding, a molten resin is injected at an extremely high speed into a mold, thereby producing a high shearing force which acts within the resin; accordingly, although not immediately apparent, there is always observed in injection molded transparent or translucent resin articles an intensive molecular orientation in the vicinity of the injecting gate, when the articles are examined between corssed polarizing plates. Such a molecular orientation often causes cracking of the molded articles. In addition, there is observed existence of flaws such as so-called jetting, flow marks, silver streaks and weld marks and frequently a sink mark. Consequently, efforts have heretofore been concentrated chiefly on the production of an article which reproduces more precisely the designed shape and on the reduction of time for each molding cycle, but hardly on the production of homogeneous and isotropic articles. A recent trend of the development in order to obtain less defective molded articles is along the line of complicating the construction and the control mechanism of injection molding machines, such as multi-stage control of the injection speed; detection and control of the extent of mold opening, injection pressure, mold clamping pressure and mold temperature.

DISCLOSURE OF INVENTION

An object of this invention is to provide a mold for injection molding which is able to give homogeneous and isotropic molded articles having none of the aforementioned defects which are observed in injection molded articles.

According to this invention, there is provided a mold for injection molding characterized in that a first gate and a second gate are provided between a runner and a cavity, said first gate constituting a connecting portion between the runner and the second gate and having a cross-sectional area smaller than that of the runner; said second gate extending from the first gate with width progressively increasing in a form simulating the shoulder part of a coathanger until it meets the cavity and having a constriction provided halfway to the cavity.

BRIEF DESCRIPTION OF DRAWINGS

FIG. 3A is a plan view;

FIGS. 3B and 3C each show an example of sectional elevations at a-a', b-b', c-c' and d-d' of FIG. 3A;

FIGS. 4A and 4B show the gate and its vicinity of another example of the mold of this invention;

FIG. 4A is a plan view and FIG. 4B is a sectional elevation at a-a' of FIG. 4A.

FIGS. 5-8 are sectional elevations of constricted portions at A-A' of FIG. 1 to illustrate chiefly cross-sectional forms of the constricted portion of the second gate.

FIG. 9 is a sectional elevation of the constricted portion at B-B' of FIG. 1.

FIGS. 17B and 17A are, respectively, a plan view and a sectional elevation at G-G' of FIG. 17B, both in full size, of a thick magnifying glass produced in Example 4.

BEST MODE FOR CARRYING OUT THE INVENTION

The invention is illustrated below in detail.

Figure 1:
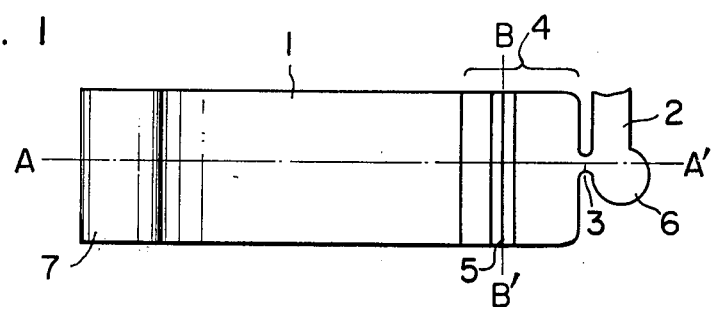
FIG. 1 is a plan view of the region including runner, cavity and their vicinities of an example of the mold of this invention.
Figure 2:
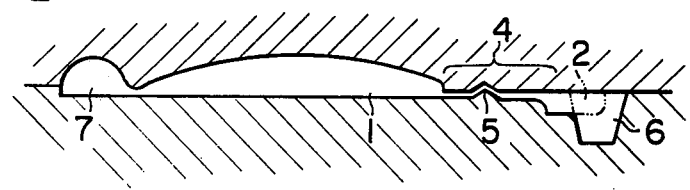
FIG. 2 is a sectional elevation at A-A' of FIG. 1.
Figure 3A:
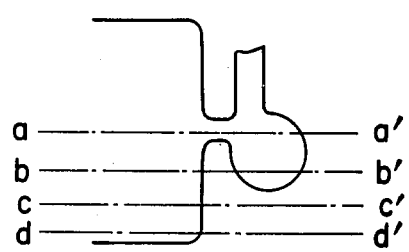
FIGS. 3A, 3B and 3C are drawings to illustrate the three-dimensional aspect of the coathanger-shaped gate according to this invention.
Figure 3B:
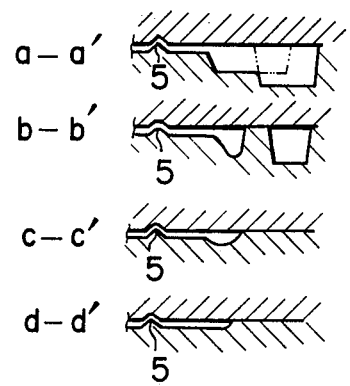
Figure 3C:
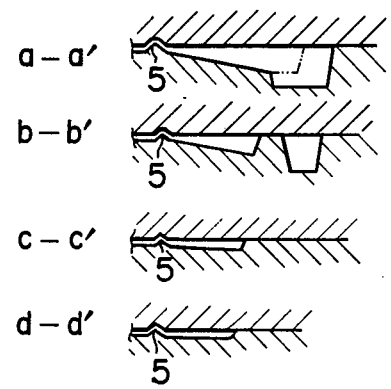
Figure 3D:
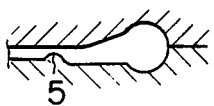
FIG. 3D is a sectional elevation at a-a' of another example.

FIG. 1 is a plan view of the region including runner and cavity of an example of the mold of this invention. FIG. 2 is a sectional elevation at A-A' of said mold. Generally, a molten resin from the nozzle at the front of an injection molding machine flows through a sprue, runner and then gate into a mold cavity. A principal feature of the mold of this invention is the provision of first gate 3 and second gate 4 between mold cavity 1 and runner 2. First gate 3 which connects with runner 2 has a cross-sectional area smaller than that of runner 2 and constitutes a connecting portion between runner 2 and the second gate. Second gate 4 in the form of the shoulder portion of a coathanger extends from first gate 3 and connects the second gate with mold cavity 1. As is apparent from FIGS. 1 and 2, the second gate with a considerably prolonged land has a wide width and narrow depth at the portion where it joins with mold cavity 1 and the portion emergent from the first gate is made smoothly streamlined like the shoulder portion of a coathanger. FIG. 3 is to illustrate in detail the three-dimensional construction of the gate region. FIG. 3A is a plan view and FIGS. 3B and 3C show sectional elevations, at a-a', b-b', c-c' and d-d' of FIG. 3A, of two examples of the mold of this invention. In FIG. 3D is further shown an example of a sectional elevation at a-a'. FIGS. 4A and 4B show a plan view and sectional elevation, respectively, of another example. The channel of the second gate shown in FIGS. 3B, 3C and 3D is an example in which the channel becomes deeper (thicker) toward the first gate and shallower (thinner) toward the mold cavity (constriction side). The second gate of another example shown in FIGS. 4A and 4B has a constant depth over the range from the first gate to the constriction. Such a gate is satisfactory when the volume of a molded article is less than about 10 cc.

The dimensions of the first and second gates are described below.

The cross-sectional area of the first gate should be smaller than that of the runner, though the depth may be the same. For instance, for a trapezoidal runner having a cross-section of 6 mm (upper side)×7 mm (lower side)×5 mm (height), a preferable dimension of the cross-section of the first gate is 3.5×5 (mm), the width being half of that of runner and the depth being the same. The periphery at the joint of the runner and the first gate is preferably imparted with a slight curvature.

Although depending upon the size of molded article, the gate land of the second gate is preferably at least 10 mm. The progressive change in thickness preferably terminates at a distance of about 2 mm from the entrance to the mold cavity. The minimum depth of the second gate is 1.0 to 2.5 mm regardless of the thickness of the molded article. This is in contrast to a conventional mold for injection molding, wherein the minimum depth is 70-80% of the thickness of the molded article (for example, "Mold Handbook for Plastics", p. 209, published by Seibundo Co.).

The width of the second gate at the point of minimum channel depth is made as broad as possible. If possible, the width is made so wide that the gate may cover the whole range of the front side of cavity, that is, the whole length of the linear portion of the region where the second gate meets the cavity. If the width of the second gate is smaller than that of the cavity front in the joining region, the gate is preferably imparted with curvature in the direction of width. The gate is preferably imparted with curvature also in the direction of thickness as far as tolerable. In short, it is preferable to impart curvature in all directions to the region where the cavity joins the second gate.

As shown in FIGS. 1, 2, 3A-3D, 4A, 4B and 5-8, the second gate according to this invention has a constriction 5 in the middle, which runs across the flow channel of the molten resin so as to reduce the thickness of the channel. At this constriction, the shearing force in the resin flow undergoes an increase, resulting in an enhancement of reheating as well as re-kneading of the resin; the resin pressure is also increased and becomes of help in preventing back flow of the resin from the cavity and, hence, in preventing a sink mark.

In FIGS. 5-8 are shown concrete examples of sectional elevations of constrictions at A-A' of FIG. 1. The construction shown in FIG. 5 is an example of the constriction having a bent construction on the land wall of the second gate; those shown in FIGS. 6-8 are examples in which a dent is formed in the land wall of the second gate.

FIG. 9 presents concrete examples of sectional elevations of the constriction at B-B' of FIG. 1. The horizontal line Pl in FIG. 9 and other Figs. indicates the contact plane between the upper and lower molds.

The constriction is designed so that the depth within the second gate may become minimum at the constriction. The thickness (depth) of the second gate in the cavity side region marked by the constriction as borderline is preferably the same as or not greater than that in the first gate side region.

In FIG. 5, if the depth of channel at the constriction is 1.0 mm, then the depth in both sides of the constriction can be 1.5 mm; or, alternatively, the depth in the first gate side is 2 mm and that in the cavity side is 1.5 mm.

The location of the constriction can be in the middle part of the second gate land. The land length between the constriction and the entrance to the cavity varies depending on the size of the second gate, but preferably it is at least 2 mm.

The functions of the first and second gates are described below.

At the first gate, the kneaded and molten resin flowing through the runner is increased in resin pressure by the reduction in cross-sectional area of the passage and undergoes shearing, thereby resulting in reheating and re-kneading of the resin. In a conventional mold, the resin flows from the gate straight on to the mold cavity, while undergoing intensive molecular orientation. In the case of the second gate of this invention which is expanded in width in the form of a coathanger as shown in FIGS. 1 and 2 and more particularly in FIGS. 3A-3D, the resin flow advances toward the mold cavity while spreading smoothly throughout the channel along the streamlined shoulder. Since the land length of the second gate is sufficiently large, the resin flow becomes perfectly laminar before reaching the cavity and enters the mold cavity uniformly as a straight and laminar flow through the entire width of entrance. Thus, from the beginning a homogeneous molten resin enters the mold cavity as a laminar flow at the lowest speed for maintaining uniform fluidity throughout the cavity; that is, the resin enters the cavity while retaining a so-called kneaded, isotropic, homogeneous state. Consequently, the molded article formed in the mold cavity becomes homogeneous and isotropic.

In this invention, it is further desirable to provide a melt stock in the runner near the first gate. The melt stock 6 has already been shown in FIGS. 1, 2 and 3A-3D. The melt stock 6 is a pool for the resin and has a depth greater than that of the runner. An optimal shape of the melt stock is a sphere, but it can be cylindrical or prismatic or even an extension of the runner. When the runner is long and large in size, the melt stock should be also of a large size. If, for example, the runner is trapezoidal, 6 mm (upper side)×7 mm (lower side)×5 mm (height), the melt stock is preferably in the form of cylinder, (15-20)$\phi$×10 (mm). It is preferred to provide the melt stock close to the first gate.

At the front end of the injection machine, near the nozzle, there remains a portion of the resin in the preceding cycle. This remaining portion of the resin at a lower temperature is called a cold slug and fills a Z-shaped portion (called Z-pin in a specialized term) provided at the foot of sprue. The molten resin injected in the succeeding cycle becomes also lower in fluidity by the loss of heat while flowing through the sprue and runner. It was found desirable for the further improvement in homogeneity and isotropicity of the molded article to collect in the melt stock said resin portions so as to keep them from entering the mold cavity. After the injection into mold cavity has been terminated, the resin remaining in the melt stock decreases in temperature more rapidly than the resin in the mold cavity, whereby an intense contraction pressure is generated. Owing to the higher pressure of the machine side, said contraction pressure acts on the first gate and serves to prevent back flow of the resin from the mold cavity and, accordingly, to prevent the development of a sink mark.

The mold of this invention is further provided preferably with a waste cavity at the side of the mold cavity opposite to the gate, i.e. rear side. In FIGS. 1 and 2 is shown the waste cavity. The waste cavity 7 is provided in such a manner that it is directly connected to the mold cavity through a shallow opening and becomes deeper toward the rear. The width of the waste cavity can be constant throughout, as shown in FIG. 1, or gradually narrowed. The shape of the waste cavity is not critical. It is preferable to locate the waste cavity near the border of the mold cavity remotest from the gate, that is, at the side opposite to the gate. The volume of the waste cavity can be several cc when the volume of the mold cavity is from several cc up to ten or more cc; the volume can be 10 or more cc at most even when the volume of mold cavity exceeds 100 cc. The region where the waste cavity joins the mold cavity is preferably imparted with curvature in both directions of width and thickness, similarly to the connecting region between the second gate and the mold cavity. It is preferable that the thickness of the resin at the entrance to the waste cavity be 1.5–2.0 (mm), the land be 3–5 (mm) and the width be 5 to 8 mm.

The waste cavity is a cavity to collect the portion of a resin which entered the mold cavity in the earliest stage of injection and which lost in heat content. With such a means the resin in the mold cavity becomes more homogeneous and more isotropic. It seems that after the injection has been completed, the resin temperature in the waste cavity decreases more rapidly, a contraction takes place, the contraction pressure is increased, and the entrance to the waste cavity is sealed by the solidified resin in a thinner zone, leaving the resin in the mold cavity under a high pressure, thus keeping the resin from developing a sink mark.

The injection molding by use of the mold for injection molding according to this invention is carried out under the customary conditions. Since the mold cavity is filled with laminar flow of molten kneaded resin of uniform temperature, the molded article is homogeneous and isotropic. The defects of conventionally injection-molded articles, such as orientation of resin molecules, jetting, silver streaking, flow marking and weld marking, are markedly removed and the sink mark is eliminated almost completely, as described several times above.

The advantages of the injection molding by using the mold of this invention are illustrated below with reference to Examples and partly by the comparison with a conventional method.

In FIGS. 10, 11A, 11B, 12A, 12B, 13, 14, 15A, 15B, 16A, 16B, 17A and 17B which show the molded articles obtained in Examples, 1', 2', 3', 4', 5', 6' and 7' indicate the parts of the molded articles corresponding to the parts of the molds indicated by 1, 2, 3, 4, 5, 6 and 7, respectively.

EXAMPLE 1

Figure 10:
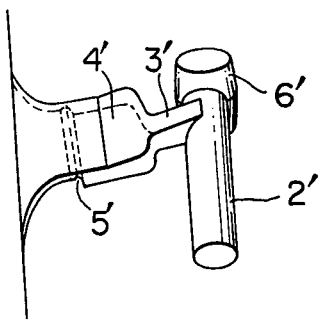
FIG. 10 is an oblique view showing the molded portion including the runner, melt stock and gates of the molded article when this invention was applied in Example 1.(1) to the injection molding of a dial plate for a stereophonic amplifier, as shown in FIGS. 11A and 11B.
Figure 11A:
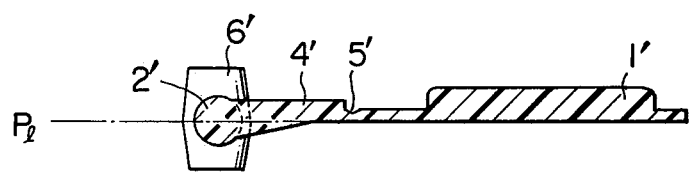
FIGS. 11B and 11A are a plan view (partly omitted) and a sectional elevation at C-C' of FIG. 11B, respectively, in full size, of the molded article obtained in the same Example.
Figure 11B:
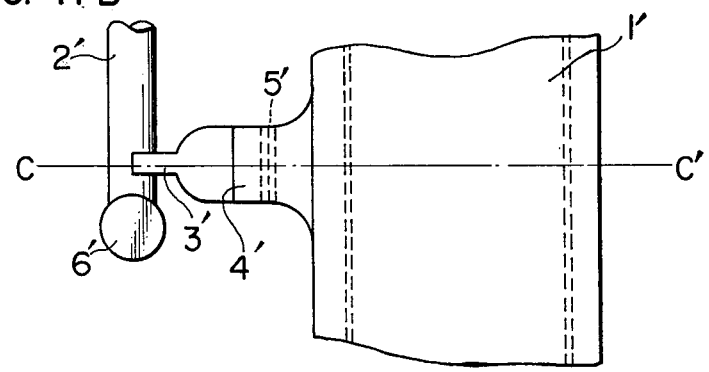

Molding of dial plate for stereophonic amplifier (1) Using a mold of this invention, a polymethyl methacrylate material was injection molded under the following conditions to obtain a dial plate, 5 mm thick, for a stereophonic amplifier shown in FIGS. 11A and 11B. FIG. 10 is an oblique view of a part of the molded article including runner, gate and melt stock. The molded dial plate for a stereophonic amplifier showed no such defects as flow marks, jetting or sink marks.

Name of resin material: "Delpet 60N" (PMMA)
Manufacturer of the resin material: Asahi Kasei Kogyo Kabushiki Kaisha
Type of injection molding machine: IS90B
Manufacturer of injection molding machine: Toshiba Machine Co.
The molding conditions were as follows:

| Injection pressure | 900 (kg/cm$^2$) |
| --- | --- |
| Plasticized quantity | 120 (g/2 cavities) |
| Revolutions of screw | 46 (rpm) |
| Clamping pressure | 75 (ton) |
| Injection time | 15 (second) |
| Cooling time | 55 (second) |
| One shot cycle | 80 (second) |
| Temperature of cylinder: | |
| Rear part (hopper side) | 200 (°C.) |
| Middle part (center) | 205 (°C.) |
| Front part (nozzle side) | 200 (°C.) |
| Mold temperature; | |
| Stationary side | 65 (°C.) |
| Movable side | 70 (°C.) |

Figure 12A:
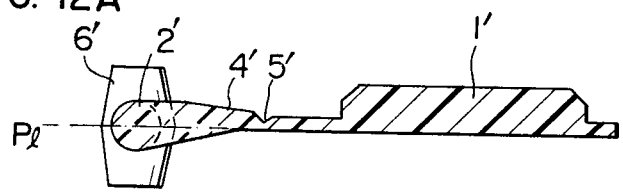
FIGS. 12B and 12A are a plan view (partly omitted) and a sectional elevation at D-D' of FIG. 12B, respectively, in full size, of a molded dial plate of a stereophonic amplifier obtained in Example 1.(2).
Figure 12B:
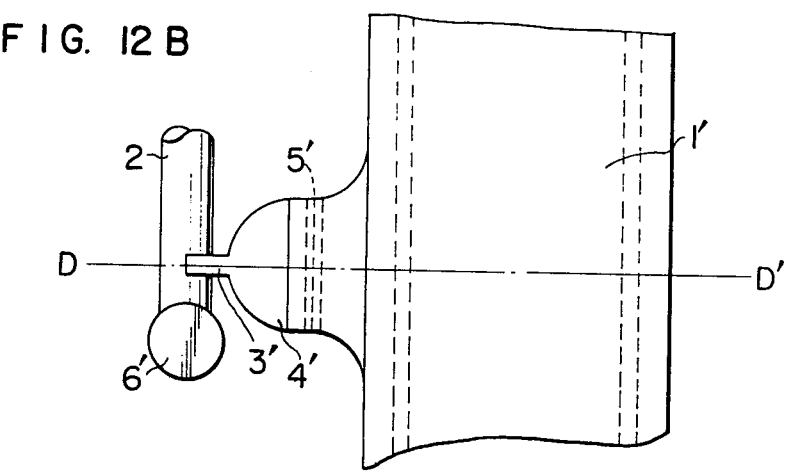

(2) In a manner similar to that described above, using a mold of this invention a polymethyl methacrylate material was injection molded under the following conditions to obtain a molded dial plate, 8 mm thick, for a stereophonic amplifier as shown in FIGS. 12A and 12B. The molded article thus obtained showed no such defects as flow marks, jetting or sink marks.

Name of resin material: "Delpet 50N" (PMMA)
Manufacturer of resin material: Asahi Kasei Kogyo Kabushiki Kaisha
Type of injection molding machine: IS200B
Manufacturer of injection molding machine: Toshiba Machine Co.
The molding conditions were as follows:

| Injection pressure | 1,200 (kg/cm$^2$) |
| --- | --- |
| Plasticized quantity | 210 (g/single cavity) |
| Revolutions of screw | 40 (rpm) |
| Clamping pressure | 180 (ton) |
| Injection time | 25 (second) |
| Cooling time | 115 (second) |
| One shot cycle | 148 (second) |
| Temperature of cylinder: | |
| Rear part (hopper side) | 185 (°C.) |
| Middle part (center) | 198 (°C.) |
| Front part (nozzle side) | 205 (°C.) |

| Mold temperature: | |
|---|---|
| Stationary side | 60 (°C.) |
| Movable side | 62 (°C.) |

COMPARATIVE EXAMPLE 1

Injection molding was carried out under the following conditions using a generally employed mold of the side-gate type having a depth of the entrance to the cavity corresponding to 80% of the thickness of the molded product. The dial plate, 5 mm thick, for a stereophonic amplifier thus obtained showed flow marks, jetting and sink marks.

Name of resin material: "Delpet 60N" (PMMA)
Manufacturer of resin material: Asahi Kasei Kogyo Kabushiki Kaisha
Type of injection molding machine: IS90B
Manufacturer of injection molding machine: Toshiba Machine Co.

The molding conditions were as follows:

| Injection pressure | 1,250 (kg/cm$^2$) |
|---|---|
| Plasticized quantity | 120 (g/2 cavities) |
| Revolutions of screw | 40 (rpm) |
| Clamping pressure | 75 (ton) |
| Injection time | 10 (second) |
| Cooling time | 65 (second) |
| One shot cycle | 100 (second) |
| Temperature of cylinder: | |
| Rear part (hopper side) | 200 (°C.) |
| Middle part (center) | 220 (°C.) |
| Front part (nozzle side) | 210 (°C.) |
| Mold temperature: | |
| Stationary side | 65 (°C.) |
| Movable side | 70 (°C.) |

EXAMPLE 2

Molding of meter cover glass

Figure 13:
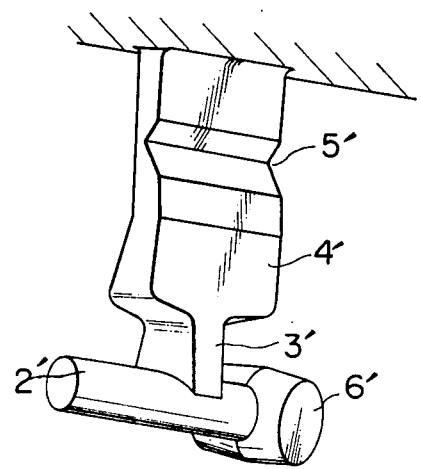
FIG. 13 is an enlarged oblique view of the molded portion including the runner, melt stock and gates of the molded cover glass in Example 2.
Figure 14:
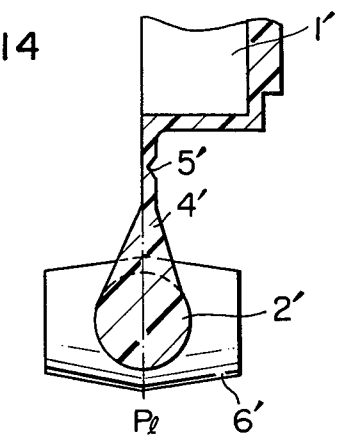
FIGS. 15A, 15B and 14 are, respectively, a plan view, elevation, both in full size, and an enlarged sectional elevation (partly omitted) at E-E' of FIG. 15A of the molded article obtained in the same Example.
Figure 15A:
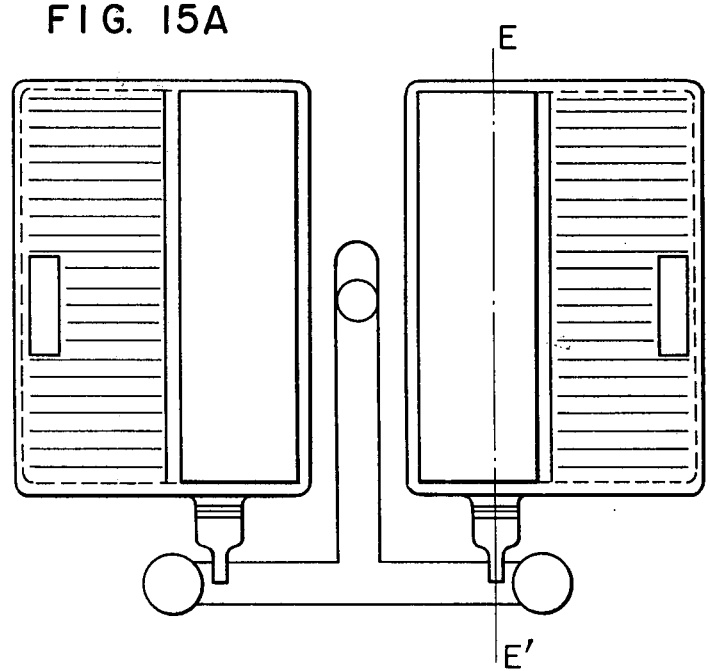
Figure 15B:

Using a mold of this invention, a polymethyl methacrylate material (PMMA) and a polycarbonate material (PC) were injection molded under the following conditions to obtain small size meter cover glass, about 70×50×17 mm, as shown in FIGS. 14, 15A and 15B, the thickness having been 1 mm in the thin-section portion and 5 mm in the thick-section portion. FIG. 13 is an oblique view of the portion including runner, melt stock and gate. The molded articles showed no weld marks, flow marks, or silver streaks.

| | [PMMA] | [PC] |
|---|---|---|
| Name of resin material: | Delpet 60N | Lexan 101 |
| Manufacturer of resin material: | Asahi Kasei Kogyo Kabushiki Kaisha | General Electric Co. |
| Type of injection machine: | N70B11 | N100B11 |
| Manufacturer of injection machine: | Nippon Steel Ltd. | Nippon Steel Ltd. |
| Molding conditions were as follows: | | |
| Injection pressure | 900 (kg/cm$^2$) | 1500 (kg/cm$^2$) |
| Plasticized quantity | 120 (g/4 cavities) | 120 (g/4 cavities) |
| Revolutions of screw | 40 (rpm) | 40 (rpm) |
| Clamping pressure | 70 (ton) | 100 (ton) |
| Injection time | 10 (second) | 12 (second) |
| Cooling time | 25 (second) | 28 (second) |
| One shot cycle | 37 (second) | 42 (second) |
| Temperature of cylinder: | | |
| Rear part (hopper side) | 220 (°C.) | 285 (°C.) |
| Middle part (center) | 225 (°C.) | 290 (°C.) |
| Front part (nozzle side) | 230 (°C.) | 285 (°C.) |
| Mold temperature: | | |
| Stationary side | 50 (°C.) | 75 (°C.) |
| Movable side | 60 (°C.) | 80 (°C.) |

EXAMPLE 3

Molding of sun glass lenses

Figure 16A:
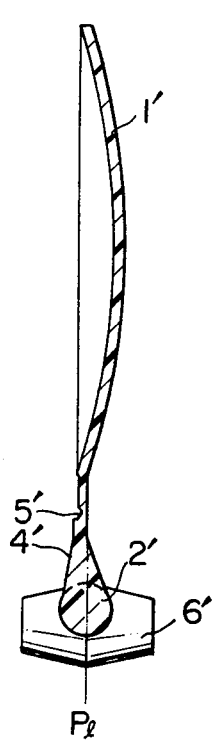
FIGS. 16B and 16A are, respectively, a plan view and a sectional elevation at F-F' of FIG. 16B of the lens for sun glasses obtained in Example 3.
Figure 16B:
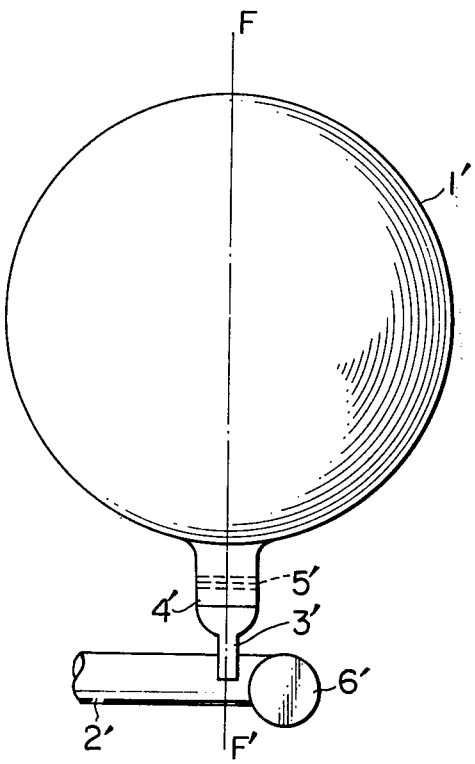

Using a mold of this invention, a polymethyl methacrylate material was injection molded under the following conditions to obtain sunglass lenses having a thickness of 2.2 mm and a spherical curvature of 78 mm$\phi$ as shown in FIGS. 16A and 16B. The molded product showed substantially no molecular orientation; no cracking was observed after the post-treatments such as dyeing and surface hardening. This seems to be due to the improvement in solvent resistance and in mechanical strength. In this case, excellent molded articles were obtained without employing a waste cavity.

Name of resin material: "Delpet 80N" (PMMA)
Manufacturer of resin material: Asahi Kasei Kogyo Kabushiki Kaisha
Type of injection molding machine: FS-75-B
Manufacturer of injection molding machine: Nissei Jushi Kōgyō Co.

The molding conditions were as follows:

| Injection pressure | 1,100 (kg/cm$^2$) |
|---|---|
| Plasticized quantity | 105 (g/4 cavities) |
| Revolutions of screw | 55 (rpm) |
| Clamping pressure | 70 (ton) |
| Injection time | 12 (second) |
| Cooling time | 15 (second) |
| One shot cycle | 32 (second) |
| Temperature of cylinder: | |
| Rear part (hopper side) | 225 (°C.) |
| Middle part (center) | 240 (°C.) |
| Front part (nozzle side) | 255 (°C.) |
| Mold temperature: | |
| Stationary side | 78 (°C.) |
| Movable side | 82 (°C.) |

EXAMPLE 4

Molding of thick magnifying glass (polymethyl methacrylate)

When a magnifying glass, 20 mm in thickness and 80 mm in diameter, was molded by using a conventional mold provided with a side gate approximating a direct gate, the molded product showed a sink mark owing to the large thickness. In addition, mechanical strengths of the portion near the gate were inferior owing to the intensive molecular orientation. In order to prevent sink marks, a long dwell time was necessary and a one shot cycle required 12 to 14 minutes.

Using a mold provided with a melt stock, coathanger-shaped gate and a waste cavity according to this invention, the same material was molded under the following conditions. The molded product, shown in FIGS. 17A and 17B, revealed substantially no molecular orientation and one shot required only 2 minutes 40 seconds to 3 minutes.

When the molded article obtained by using the conventional mold was immersed for 5 minutes in a mixture of methyl ethyl ketone and ethyl alcohol, clouding appeared in the region near the gate, whereas the molded product obtained by using the mold of this invention showed no abnormality even after immersion for 10 minutes. No decrease in mechanical strength near the gate was observed.

Name of resin material: "Delpet 80N" (PMMA)
Manufacturer of resin material: Asahi Kasei Kogyo Kabushiki Kaisha
Type of injection molding machine: SN520
Manufacturer of injection molding machine: Niigata Engineering Co.
The molding conditions were as follows:

| Injection pressure | 1,400 (kg/cm$^2$) |
|---|---|
| Plasticized quantity | 52 (g/single cavity) |
| Speed of screw | 48 (rpm) |
| Clamping pressure | 175 (ton) |
| Injection time | 24 (second) |
| (Dwell time) | 80 (second) |
| Cooling time | 65 (second) |
| One shot cycle | 160–180 (second) |
| Temperature of cylinder: | |
| Rear part (hopper side) | 225 (°C.) |
| Middle part (center) | 230 (°C.) |
| Front part (nozzle side) | 230 (°C.) |
| Mold temperature: | |
| Stationary side | 92 (°C.) |
| Movable side | 98 (°C.) |

INDUSTRIAL APPLICABILITY

As described in the foregoing, in the injection molding of clear resins such as polystyrene and particularly polymethyl methacrylate in a mold of this invention, the molded article as such discharged from the mold cavity is a perfectly homogeneous and isotropic product. The mold of this invention is very useful for the production of various meter cover glass, dust covers for stereos, cover glasses for watches and the like, optical lenses and prisms, spectacle lenses, etc. The mold of this invention has a few drawbacks including slight complication in manufacture of the mold and a slight increase in waste resin by trimming. These drawbacks, however, can be sufficiently compensated for by the advantages of elimination of machinining of the product to cut out intended articles, elimination of cutting work to remove the gate from the molded articles, and reduction of the complication of both injection molding machine and control mechanism. In addition, it is of great significance for the field of producing above-noted transparent articles that the homogeneous and isotropic molded articles are obtained with dimensional precision.

I claim:

1. A mold for injection molding characterized in that a first gate and a second gate are provided between runner and cavity, said first gate constituting a connecting portion between the runner and the second gate and having a cross-sectional area smaller than that of the runner, said second gate extending from the first gate with width progressively increasing in a form simultating the shoulder part of a coathanger until it meets the cavity and having a constriction halfway to the cavity.

2. A mold for injection molding according to claim 1, wherein the cavity is composed of a mold cavity and a waste cavity connected to the rear part of said mold cavity through an opening having a depth smaller than the elevation of said rear part, said waste cavity forming a cavity deeper than said opening.

3. A mold for injection molding according to claim 1 or 2, wherein the mold has a melt stock which is situated closely to the first gate and connected to the runner, said melt stock having a cross-sectional area larger than that of the first gate and a depth larger than that of the runner.

4. A molded synthetic resin article obtained by injection molding by use of a mold for injection molding according to claim 1.

5. A molded synthetic resin article obtained by injection molding by use of a mold for injection molding according to claim 2.

6. A molded synthetic resin article obtained by injection molding by use of a mold for injection molding according to claim 3.

* * * * *